United States Patent
Mangin

(10) Patent No.: US 9,718,406 B2
(45) Date of Patent: Aug. 1, 2017

(54) DRIVER INFORMATION SYSTEM IN A VEHICLE

(71) Applicant: Robert Bosch GmbH, Stuttgart (DE)

(72) Inventor: Benoit Mangin, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 64 days.

(21) Appl. No.: 14/792,791

(22) Filed: Jul. 7, 2015

(65) Prior Publication Data
US 2016/0016515 A1    Jan. 21, 2016

(30) Foreign Application Priority Data
Jul. 21, 2014   (DE) .......................... 10 2014 214 088

(51) Int. Cl.
| | | |
|---|---|---|
| *B60R 1/00* | (2006.01) | |
| *G02B 27/01* | (2006.01) | |
| *G06F 3/01* | (2006.01) | |
| *B23K 26/02* | (2014.01) | |
| *B60R 1/04* | (2006.01) | |
| *G02B 27/00* | (2006.01) | |
| *B60R 1/12* | (2006.01) | |

(52) U.S. Cl.
CPC ............... *B60R 1/00* (2013.01); *B23K 26/02* (2013.01); *B60R 1/04* (2013.01); *G02B 27/0093* (2013.01); *G02B 27/01* (2013.01); *G06F 3/013* (2013.01); *B60R 2001/1253* (2013.01); *B60R 2300/205* (2013.01); *G02B 2027/0187* (2013.01)

(58) Field of Classification Search
CPC ......... G08B 23/00; G08G 1/16; B60W 30/08; B60W 30/0956; B60W 40/04; B60W 2050/0075; B60W 2550/10; G01S 13/931; B60R 1/1207; B60R 1/1215; G02B 27/0093; G02B 27/01
USPC ......... 340/425.5, 436, 438, 576, 903; 701/1, 701/36, 70, 301; 348/148
See application file for complete search history.

(56) References Cited

U.S. PATENT DOCUMENTS

| | | | | |
|---|---|---|---|---|
| 2004/0255817 | A1* | 12/2004 | Yang | B60F 1/00 105/238.1 |
| 2006/0171562 | A1* | 8/2006 | Yoshida | B60R 1/00 382/104 |
| 2007/0032929 | A1* | 2/2007 | Yoshioka | G07C 5/008 701/33.4 |
| 2009/0243880 | A1* | 10/2009 | Kiuchi | G08G 1/166 340/903 |
| 2010/0295670 | A1* | 11/2010 | Sato | B60Q 3/042 340/458 |
| 2013/0058116 | A1* | 3/2013 | Galbas | B60Q 1/085 362/512 |
| 2014/0139655 | A1* | 5/2014 | Mimar | G08B 21/0476 348/77 |
| 2014/0244105 | A1* | 8/2014 | Dariush | B60W 50/0098 701/36 |
| 2014/0249717 | A1* | 9/2014 | Takahashi | B60R 21/00 701/36 |

\* cited by examiner

*Primary Examiner* — Hung T Nguyen
(74) *Attorney, Agent, or Firm* — Norton Rose Fulbright US LLP; Gerard Messina

(57) ABSTRACT

A driver information system in a vehicle encompasses a viewing direction recognition unit and an indicating unit for indicating a critical event for the case in which the deviation between the driver's viewing direction and the critical event exceeds a limit value.

20 Claims, 1 Drawing Sheet

DRIVER INFORMATION SYSTEM IN A VEHICLE

RELATED APPLICATION INFORMATION

The present application claims priority to and the benefit of German patent application no. 10 2014 214 088.9, which was filed in Germany on Jul. 21, 2014, the disclosure of which is incorporated herein by reference.

FIELD OF THE INVENTION

The present invention relates to a driver information system in a vehicle.

BACKGROUND INFORMATION

Driver information systems in vehicles, for example head-up displays by way of which vehicle information and surroundings information is projected into the driver's field of view, are known. The information displayed, for example, is the vehicle speed, data of a navigation system, or relates to the current traffic situation. The information derives from a sensor suite integrated into the vehicle for ascertaining vehicle condition variables and surroundings data, and from a navigation system.

SUMMARY OF THE INVENTION

The object on which the invention is based is that of creating a driver information of simple configuration that improves driving safety, by way of which safety-relevant information can be indicated to the driver.

This object is achieved according to the present invention with the features described herein. The further descriptions herein describe useful refinements.

The driver information system according to the present invention can be used in vehicles, in particular motor vehicles, in order to supply the driver with information about a critical event in the vehicle's surroundings. The critical event is indicated to the driver with the aid of a indicating unit associated with the driver information system. Also part of the driver information system is a viewing direction recognition unit by way of which the current direction in which the driver is looking can be detected.

If it is ascertained in the driver information system that the current driver's viewing direction deviates from the position of the critical event situated from the driver's viewpoint, and if the deviation exceeds a limit value, the position of the critical event is then indicated, or the a notification of the position of the critical event is given, in the indicating unit. The driver's gaze is directed to the position of the critical event via the activation of the indicating unit, so that the driver has the ability to perceive the critical event and to react thereto, for example by way of a steering actuation or braking actuation. It is thus possible to direct the driver's attention to a critical event with the aid of the driver information system, thereby enhancing driving safety.

The indicating unit may be a visual unit for presenting the critical event. Indicating units that are perceptible via a different sense are also possible, however, for example indicating units for acoustically presenting the position of a critical event, which are activated at least in the case in which a difference exceeding a limit value exists between the current driver's viewing direction and the position of the critical event.

According to a further advantageous embodiment, the indicating unit is embodied in such a way that a connection perceptible with the senses is created between a point located on the viewing line of the driver and the position of the critical event. This may be a visual connecting line or a signal traveling toward the site of the critical event, for example in the form of a moving arrow. Additionally or alternatively, the position of the critical event situated from the driver's viewpoint can also be presented in the indicating unit, for example by constant illumination, a flashing signal, and/or an attention-attracting color.

The nature of the indication via the indicating unit is optionally made dependent on the difference between the current driver's viewing direction and the position of the critical event. For example, if there is only a relatively small deviation between the driver's viewing direction and the position of the critical event, which deviation still permits perception with no change in the direction of view, it can be sufficient simply to indicate the position via the indicating unit, for example by flashing. Conversely, for a greater deviation between the driver's viewing direction and the position of the critical event, which deviation is beyond perception by the driver, it can be advantageous to provide a visual traveling motion of an arrow or dot, proceeding from a virtual dot that is located on the viewing line of the driver's viewing direction toward the position of the critical event.

A variety of presentations of the position of the critical event are appropriate. On the one hand, in particular for a critical event located in the vehicle surroundings, the position or a traveling motion of an arrow or the like toward the critical event can be projected into the windshield or at a virtual focal point located in front of the windshield. It is possible, for example, analogously to a head-up display, to provide a virtual focal point approximately at the front end of the vehicle hood, or in front of the hood, and to present the depiction of the critical event, and/or the traveling motion of an arrow, at that virtual point. The projection plane for presentation of the critical event is located approximately parallel to the windshield.

The projection surface for presenting the critical event can also be located inside the vehicle, for example on the dashboard in the form of a passive reflection surface or as a display screen on which events can be presented in a manner known per se.

In an embodiment as a visual indicating unit, the latter is embodied, for example, as a laser pointer with which a laser beam, which presents the position of the critical event on an indicator visible to the driver, can be generated. This indicator is, for example, the above-described projection surface, for example a virtual projection surface located in front of the windshield, a passively embodied projection surface in the vehicle interior, or a display screen.

The laser pointer is advantageously mounted in the vehicle interior and directed toward the projection surface, an arrow or dot traveling toward the position of the critical event situated from the driver's viewpoint, and/or a symbol characterizing the position of the critical event, being generatable with the aid of the laser pointer.

According to a further advantageous embodiment, the indicating unit is embodied as a head-up display in which information is projected in front of the windshield and with a focal point located outside the windshield. A dot or arrow traveling toward the critical event, or the critical event itself as presented from the driver's viewpoint, can likewise be indicated via the head-up display. Different indicating systems can optionally also be combined with one another, for example a laser pointer to generate a traveling dot or arrow, and a head-up display for symbolic presentation of the critical event.

The viewing direction recognition unit used is, for example, an infrared camera that is directed toward the driver's head and enables a determination of the direction of view from reflections off the eye. The current driver's viewing direction can be ascertained therefrom. The angle between the current viewing direction of the driver and the position of the critical event is calculated, for example, in the driver information system, and an indication of the critical event is presented in the indicating unit.

The viewing direction recognition unit can be located below eye height, for example on the steering column in the vehicle. Also appropriate, however, is a positioning of the viewing direction recognition unit at eye height or above eye height, for example on the interior mirror.

The critical event may be an event from the vehicle surroundings that is presented via the indicating unit. This relates, for example, to further traffic participants, for example further vehicles or persons. The information from the vehicle surroundings is detected, in particular, via a surroundings sensor suite in the vehicle.

The critical event can also refer, however, to a device in the vehicle that is in a critical condition, for example the braking system or steering system of the vehicle. In this case it is useful to present the critical event on a display screen in the vehicle or on a head-up display, and to direct the driver's attention to the critical event respectively on the display screen or head-up display.

The assessment as to whether the event is to be categorized as critical is also advantageously made in the driver information system. Evaluation routines that assign a critical value to a detected event can execute for this purpose in a calculation unit of the driver information system. It is also possible, however, to perform the assessment of the event outside the information system, for example in a closed- or open-loop control device in the vehicle, and to deliver a corresponding signal to the driver information system for the case in which a critical event does in fact exist.

Further advantages and useful embodiments may be gathered from the further descriptions herein, the description of the Figures, and the drawings. In the Figures, identical components are labeled with identical reference characters.

DETAILED DESCRIPTION

Figure 1:
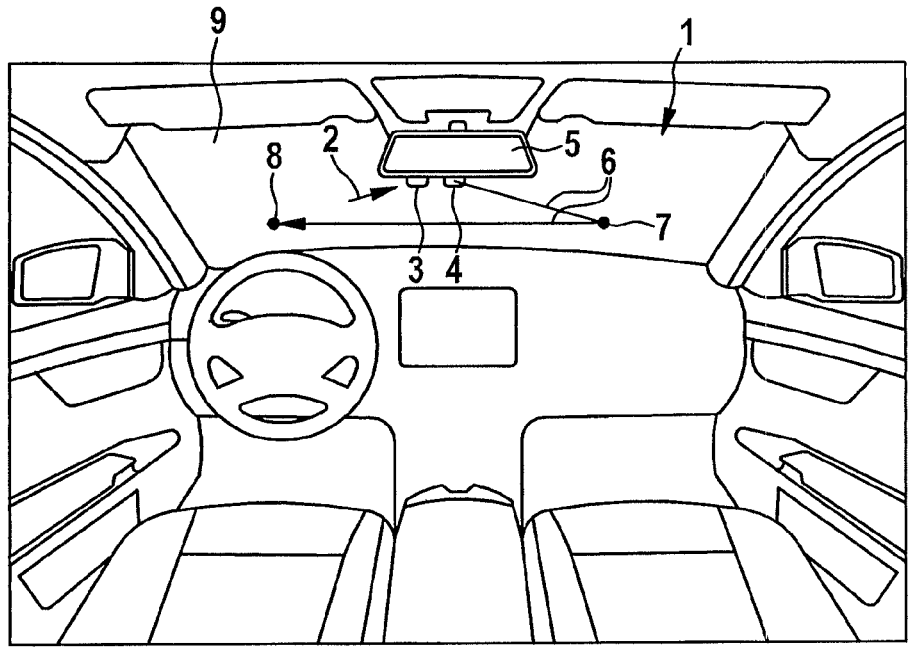
FIG. 1 is a perspective view of a vehicle interior having an integrated driver information system that encompasses a viewing direction recognition unit as well as an indicating unit for indicating a critical event, the indicating unit being embodied as a laser pointer for generating a laser beam, the laser beam generating a dot that travels between the driver viewing direction and a critical event and is projected in front of the windshield.

FIG. 1 depicts a vehicle interior 1 of a motor vehicle into which a driver information system 2, which serves to supply the driver with information regarding a current critical event, is integrated. The critical event is in particular one from the vehicle surroundings, for example a hazardous situation with a further traffic participant. Also relevant, however, is a critical event that is located inside the vehicle, for example a critical condition of an accessory or of a device in the vehicle, for example of the steering system or braking system.

Driver information system 2 encompasses a viewing direction recognition unit 3 and an indicating unit 4, which in FIG. 1 are both mounted, by way of example, on interior rear view mirror 5. Viewing direction recognition unit 3 and indicating unit 4 are optionally disposed in one common housing.

Viewing direction recognition unit 3 is embodied as an infrared camera, which is directed toward the camera and which can ascertain the driver's current viewing direction based on eye reflections.

Indicating unit 4 encompasses a laser pointer with which a laser beam 6, which travels between viewing direction 7 of the driver and the current position of a critical event 8 from the driver's viewpoint, can be generated. Laser beam 6 is, for example, emitted intermittently in such a way that a dot traveling from viewing direction 7 to critical event 8 is presented. Laser beam 6 is directed onto windshield 9 of the vehicle, preferably between a virtual focal point situated outside the windshield and located on the line of viewing direction 7, and a virtual focal point that is located, from the driver's viewpoint, on a line between the driver and critical event 8. The driver's attention is directed toward critical event 8 as a result of the traveling motion of laser beam 6 from viewing direction 7 to critical event 8. The driver thus acquires the ability to become aware of critical event 8 even though his or her view is directed toward a location outside the critical event.

Figure 2:
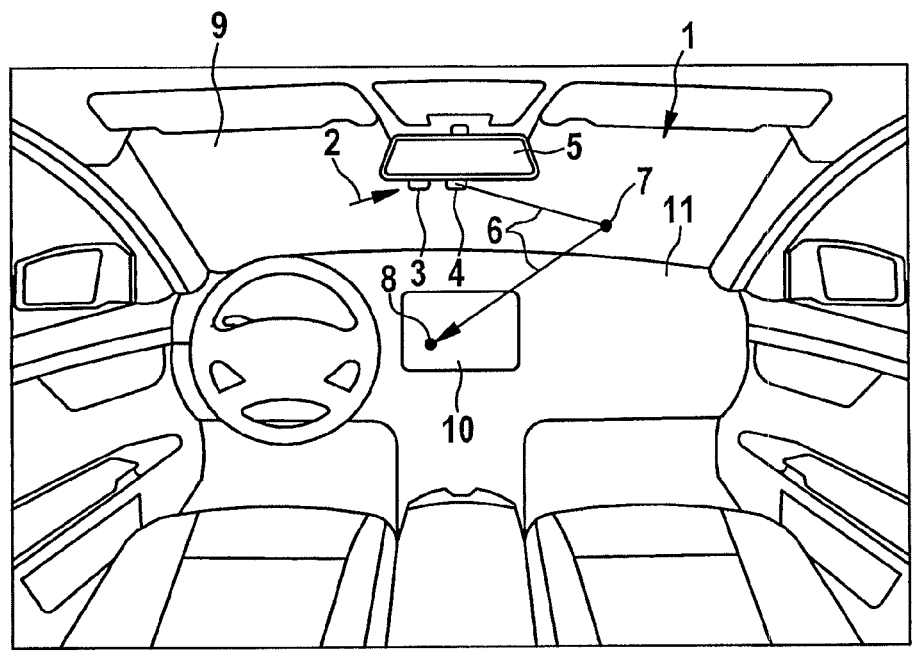
FIG. 2 is a depiction corresponding to FIG. 1 in which, however, the laser beam is directed onto a projection surface on the dashboard.

In FIG. 1, a virtual plane outside windshield 9 forms a projection surface for laser beam 6; the focal point is located outside windshield 9. FIG. 2 depicts a further exemplifying embodiment in which a driver information system 2 is likewise integrated into vehicle interior 1 of a vehicle. In FIG. 2, however, a projection surface 10 is located on dashboard 11 in vehicle interior 1. This can be a passive projection surface 10 that is embodied so that a laser beam directed thereonto is detectable by the driver. Projection surface 10 is optionally embodied as a display screen on which, in known fashion, symbols that can characterize a critical event 8 can be presented. In this case laser beam 6 is directed onto critical event 8 on projection surface 10 embodied as a display screen.

It is furthermore also possible to provide as an indicating unit a head-up display that is installed in the vehicle and can be used for the driver information system. A light source having a focal point outside the windshield is part of the head-up display.

Driver information system 2 is activated in particular for the case in which the driver's viewing direction deviates significantly from the position of the critical event 8 seen from the driver's viewpoint. The angle between driver's viewing direction 7 and the position of critical event 8 can be utilized in this context; if the angle exceeds an associated limit value, indicating unit 4 is activated and laser beam 6 is emitted in order to direct the driver's attention to the critical event.

What is claimed is:
1. A driver information system in a vehicle, comprising:
   a viewing direction recognition unit to recognize a driver's viewing direction;
   an indicating unit to indicate a position of a critical event for when a controller determines that a deviation as an angle between the driver's viewing direction and the position of the critical event situated from the driver's viewpoint exceeds a limit value.

2. The driver information system of claim 1, wherein the indicating unit is active only when the deviation between the driver's viewing direction and the position of the critical event exceeds the limit value.

3. The driver information system of claim 1, wherein the indicating unit is embodied for visual presentation of the critical event.

4. The driver information system of claim 1, wherein the indicating unit includes a laser pointer for generating a laser beam that presents the position of the critical event on an indicator visible to the driver.

5. The driver information system of claim 4, wherein the laser pointer is mounted in the vehicle interior and is directed onto a projection surface.

6. The driver information system of claim 5, wherein the projection surface is located on a dashboard.

7. The driver information system of claim 5, wherein the projection surface is located on or outside a windshield.

8. The driver information system of claim 1, wherein the indicating unit is embodied as a head-up display.

9. The driver information system of claim 1, wherein a dot or arrow traveling between the driver's viewing direction and the position of the critical event is presentable in the indicating unit.

10. The driver information system of claim 1, wherein various symbols for characterizing the critical event are presentable in the indicating unit.

11. The driver information system of claim 1, wherein the viewing direction recognition unit encompasses an infrared camera directed onto an eye of the driver.

12. The driver information system of claim 1, wherein a critical event in the vehicle surroundings is indicated in the indicating unit.

13. The driver information system of claim 1, wherein the indicating unit acoustically indicates the critical event.

14. The driver information system of claim 1, wherein the indicating unit indicates a connection between a point within the driver's viewing direction and the position of the critical event.

15. The driver information system of claim 14, wherein the indicating unit indicates the connection using a line.

16. The driver information system of claim 14, wherein the indicating unit indicates the connection using a signal travelling toward the position of the critical event.

17. The driver information system of claim 1, wherein the indicating unit indicates the critical event in a manner as a function of the deviation between the driver's viewing direction and the position of the critical event.

18. The driver information system of claim 11, wherein the driver's viewing direction is determined from infrared reflections off the eye of the driver.

19. The driver information system of claim 1, wherein the critical event is determined using a sensor of the vehicle.

20. The driver information system of claim 1, wherein the critical event includes condition of a device of the vehicle.

* * * * *